US012809463B2

(12) United States Patent
Park et al.

(10) Patent No.: US 12,809,463 B2
(45) Date of Patent: Nov. 24, 2026

(54) FORCE AND COMPLEX VIBRATION RENDERING SYSTEM USING FORCE FEEDBACK DEVICE AND WIDEBAND RESONANCE ACTUATOR AND METHOD FOR PROVIDING FORCE AND COMPLEX VIBRATION USING THE SYSTEM

(71) Applicants: GIST(Gwangju Institute of Science and Technology), Gwangju (KR); Gleam Systems Co., Ltd., Daejeon (KR)

(72) Inventors: Gun Hyuk Park, Gwangju (KR); Gyeong Deok Kim, Gwangju (KR); Dong Hyeon Kim, Gwangju (KR); Bong Soo Kim, Daejeon (KR); Sung Ho Kim, Daejeon (KR)

(73) Assignees: GIST(Gwangju Institute of Science and Technology), Gwangju (KR); Gleam Systems Co., Ltd., Daejeon (KR)

( * ) Notice: Subject to any disclaimer, the term of this patent is extended or adjusted under 35 U.S.C. 154(b) by 438 days.

(21) Appl. No.: 18/478,769

(22) Filed: Sep. 29, 2023

(65) Prior Publication Data

US 2024/0108977 A1 Apr. 4, 2024

(30) Foreign Application Priority Data

Sep. 30, 2022 (KR) ........................ 10-2022-0125641

(51) Int. Cl.
*G06F 3/01* (2006.01)
*G05G 9/047* (2006.01)
*G06F 3/0338* (2013.01)

(52) U.S. Cl.
CPC ............ *G06F 3/016* (2013.01); *G06F 3/0338* (2013.01); *G05G 2009/04766* (2013.01)

(58) Field of Classification Search
CPC .................. G06F 3/016; G06F 3/0338; G05G 2009/04766
See application file for complete search history.

(56) References Cited

U.S. PATENT DOCUMENTS 11,009,959 B1 * 5/2021 Piazza ................ G02B 27/0172
2021/0136515 A1 * 5/2021 Zhang ................... H04W 4/023
2021/0218324 A1 * 7/2021 Hashimoto ............ H02K 33/16

FOREIGN PATENT DOCUMENTS

KR 10-1021595 B1 3/2011

* cited by examiner

*Primary Examiner* — Quan Zhen Wang
*Assistant Examiner* — Mancil Littlejohn, Jr.
(74) *Attorney, Agent, or Firm* — Studebaker Brackett PLLC

(57) ABSTRACT

The present disclosure relates to a force and complex vibration rendering system using a force feedback device and a wideband resonance actuator, and a method for providing force and complex vibration using the system. The force and complex vibration rendering system includes: a haptic device configured to be operated by a user to input an operation signal and configured to be able to provide reaction force or vibration to the user; a wideband resonance actuator installed at the haptic device and configured to output vibration at an output speed different from an output speed of vibration that is generated at the haptic device; an image provider configured to create and provide a virtual image, which includes at least one target object and an instrument object that is moved in correspondence to an operation signal input to an operation member, to the user; and a touch provider configured to calculate reaction force and vibration, which are generated at the instrument object when the instrument object collides with the target object in the virtual image, and control the haptic device and the (Continued)

wideband resonance actuator such that the calculated reaction force and vibration are applied to the user.

The force and complex vibration rendering system using a force feedback device and a wideband resonance actuator and a method for providing force and complex vibration using the system provide not only reaction force but wide bandwidth vibration to a user when a collision situation occurs in virtual simulation through a wideband resonance actuator that generates vibration at an output speed higher than a vibration output speed of the force feedback device of the haptic device, so the system and method have an advantage that it is possible to provide more real touch feedback to the user.

21 Claims, 3 Drawing Sheets

FORCE AND COMPLEX VIBRATION RENDERING SYSTEM USING FORCE FEEDBACK DEVICE AND WIDEBAND RESONANCE ACTUATOR AND METHOD FOR PROVIDING FORCE AND COMPLEX VIBRATION USING THE SYSTEM

CROSS REFERENCE TO RELATED APPLICATION

The present application claims priority to Korean Patent Applications No. 10-2022-0125641, filed on Sep. 30, 2022 the entire contents of which are incorporated herein for all purposes by this reference.

BACKGROUND

Technical Field

The present disclosure relates to a force and complex vibration rendering system using a force feedback device and a wideband resonance actuator, and a method for providing force and complex vibration using the system. In more detail, the present disclosure relates to a force and complex vibration rendering system using a force feedback device and a wideband resonance actuator, the system can provide a user with vibration, which is generated when a virtual object, which is moved in correspondence to an operation signal input by a user, collides with a target object, using a force feedback device and a wideband resonance actuator, and a method for providing force and complex vibration using the system.

Description of the Related Art

Recently, virtual training simulation programs that use a graphic and audio rendering technology are used to provide visual and auditory experience in the fields that require an expert cultivation process including a medical operation and ultra precision machining, and in addition, tactile information is provided through force rendering using a force feedback device to provide tactile experience similar to actuality to a user.

However, touch that is felt in an actual situation is composed of reaction force and vibration of low bandwidth and high bandwidth accompanying interaction with an object, and as a plan for transmitting such touch to a user, methods of outputting touch through a force feedback device by adding a vibration vector of low bandwidth and high bandwidth to a force vector calculated from reaction force have been designed. For example, there is an 'Implant simulation system using haptic interface' in Korean Patent No. 10-20 1021595.

However, the force feedback device of common haptic devices has a vibration output speed of 1 kHz, so it is theoretically difficult to output vibration of high hand over 500 Hz, and substantially, it is difficult to output even vibration of low band over 200 Hz in accordance with an intended signal, whereby it is difficult to provide touch similar to an actual situation.

PRIOR ART DOCUMENT

Patent Document

Korean Patent No. 10-1021595: Implant simulation system using haptic interface

SUMMARY

The present disclosure has been made in an effort to solve the problems described above and an objective of the present disclosure is to provide a force and complex vibration rendering system using a haptic device and a wideband resonance actuator, the system being able to provide reaction force and wide-bandwidth vibration to a user when a collision occurs between objects in a virtual simulation on a device object and a target object that are implemented on the basis of operation signals input by the user, and a method for providing force and complex vibration.

In order to achieve the objectives, a force and complex vibration rendering system using a force feedback device and a wideband resonance actuator according to the present disclosure includes: a haptic device configured to be operated by a user to input an operation signal and configured to be able to provide reaction force or vibration to the user; a wideband resonance actuator installed at the haptic device and configured to output vibration at an output speed different from an output speed of vibration that is generated at the haptic device; an image provider configured to create and provide a virtual image, which includes at least one target object and an instrument object that is moved in correspondence to an operation signal input to an operation member, to the user; and a touch provider configured to calculate reaction force and vibration, which are generated at the instrument object when the instrument object collides with the target object in the virtual image, and control the haptic device and the wideband resonance actuator such that the calculated reaction force and vibration are applied to the user.

The touch provider includes: a feedback calculator configured to calculate reaction force and vibration that are generated at the instrument object when the instrument object collides with the target object in the virtual image; and a controller configured to operate the haptic device and the wideband resonance actuator such that touch feedback corresponding to the reaction force and the vibration calculated by the feedback calculator is provided to the user.

The feedback calculator includes: a reaction force calculation module configured to calculate reaction force that is generated at the instrument object when the target object and the instrument object collide with each other; and a vibration calculation module configured to calculate a vibration signal about vibration generated at the instrument object when the target object and the instrument object collide with each other.

The controller includes: a signal classification module configured to classify a vibration signal provided from the vibration calculation module into a first unit signal that is an output target signal at the haptic device and a second unit signal that is an output target signal at the wideband resonance actuator; a haptic operation module configured to operate the haptic device such that reaction force and vibration that correspond to the reaction force calculated by the reaction force calculation module and the first unit signal classified by the signal classification module are output; and an actuator operation module configured to operate the wideband resonance actuator such that vibration corresponding to the second unit signal classified by the signal classification module is output.

The wideband resonance actuator may output vibration at an output speed higher than the output speed of vibration that is output from the haptic device.

The signal classification module sets a signal having a frequency, which is lower than a preset reference frequency, in the operation signal as the first unit signal and sets a signal having a frequency, which is equal to or higher than the reference frequency, as the second unit signal.

The reference frequency is set in the signal classification module as a value smaller than a maximum output frequency of vibration that is output from the haptic device.

It is preferable that the reference frequency is 150 Hz.

The vibration calculation module may calculate the vibration signal by applying information about movement of the instrument object in collision with the target object provided from the image provider to a neural network model constructed in advance to calculate a vibration signal generated at the instrument object on the basis of information about movement of the instrument object when the target object and the instrument object collide with each other.

An Autoregressive Moving Average (ARMA) model is applied as the neural network model.

The haptic device includes: an operation member configured to be operated by a user to input an operation signal; and a force feedback device configured to apply reaction force or vibration to the user operating the operation member, and the wideband resonance actuator is installed at the operation member by an adapter and applies vibration to the user through the operation member.

The force feedback device is installed at the operation member and may provide reaction force or vibration to the user through the operation member.

Meanwhile, a method for providing force and complex vibration according to the present disclosure includes: a collision sensing step of sensing a collision of an instrument object, which is moved in accordance with an operation signal input by a user operating a haptic device in a virtual image, with a target object included in the virtual image; a feedback calculation step of calculating reaction force and vibration that are generated at the instrument object by means of a feedback calculator when a collision of the target object and the instrument object is sensed in the collision sensing step; and an operating step of operating the haptic device and a wideband resonance actuator installed at the haptic device by means of a controller such that touch feedback corresponding to the reaction force and the vibration calculated in the feedback calculation step is provided to the user, wherein the wideband resonance actuator may output vibration at an output speed different from an output speed of vibration that is output from the haptic device.

The feedback calculation step includes: a reaction force calculation step of calculating reaction force that is generated at the instrument object when the target object and the instrument object collide with each other; and a vibration calculation step of calculating a vibration signal about vibration generated at the instrument object in collision with the target object.

The operation step includes: a signal classification step of classifying a vibration signal provided in the vibration calculation step into a first unit signal that is an output target signal at the haptic device and a second unit signal that is an output target signal at the wideband resonance actuator; a first device control step of operating the haptic device such that reaction force and vibration that correspond to the reaction force calculated in the reaction force calculation step and the first unit signal classified in the signal classification step are output; and a second device control step of operating the wideband resonance actuator such that vibration corresponding to the second unit signal classified in the signal classification step is output.

The signal classification step sets a signal having a frequency, which is lower than a preset reference frequency, in the operation signal as the first unit signal and sets a signal having a frequency, which is equal to or higher than the reference frequency, as the second unit signal.

The reference frequency is set in the signal classification step as a value smaller than a maximum output frequency of vibration that is output from the haptic device.

The vibration calculation step may calculate the vibration signal by applying information about movement of the instrument object provided from an image provider that creates a virtual image to a neural network model constructed in advance to calculate a vibration signal generated at the instrument object on the basis of information about movement of the instrument object when the target object and the instrument object collide with each other.

The force and complex vibration rendering system using a force feedback device and a wideband resonance actuator and a method for providing force and complex vibration using the system provide not only reaction force but wide bandwidth vibration to a user when a collision situation occurs in virtual simulation through a wideband resonance actuator that generates vibration at an output speed higher than a vibration output speed of the force feedback device of the haptic device, so the system and method have an advantage that it is possible to provide more real touch feedback to the user.

BRIEF DESCRIPTION OF THE DRAWINGS

The above and other objectives, features and other advantages of the present disclosure will be more clearly understood from the following detailed description when taken in conjunction with the accompanying drawings, in which.

DETAILED DESCRIPTION

Figure 1:
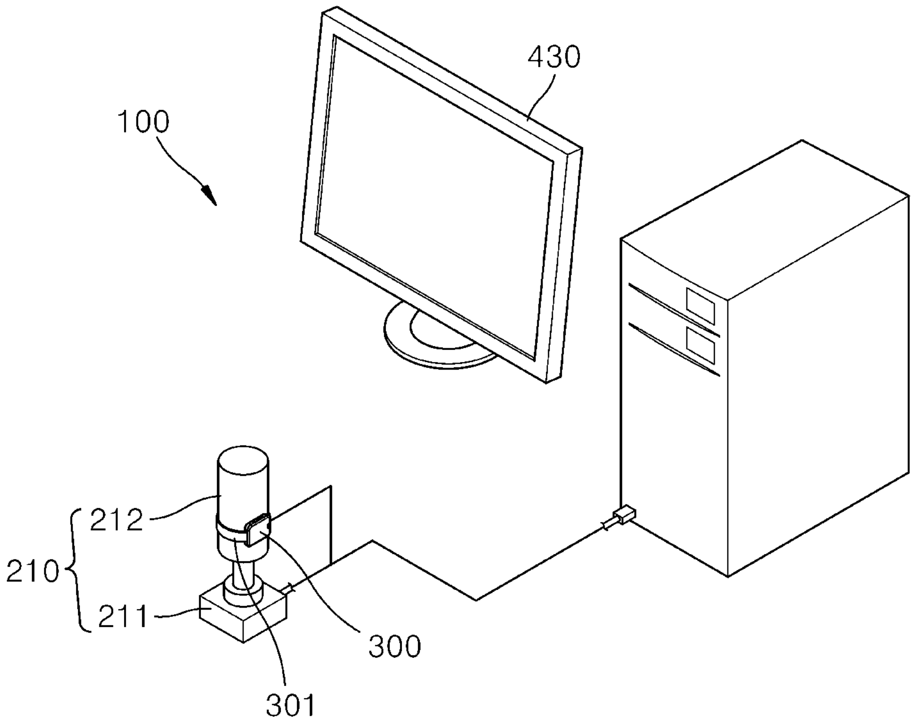
FIG. 1 is a conceptual diagram of a force and complex vibration rendering system using a force feedback device and a wideband resonance actuator according to the present disclosure.

Hereafter, a force and complex vibration rendering system using a force feedback device and a wideband resonance actuator according to an embodiment of the present disclosure and a method for providing force and complex vibration using the system are described in detail with reference to the accompanying drawings. The present disclosure may be modified in various ways and implemented by various exemplary embodiments, so specific exemplary embodiments are shown in the drawings and will be described in detail herein. However, it is to be understood that the present disclosure is not limited to the specific exemplary embodiments, but includes all modifications, equivalents, and substitutions included in the spirit and the scope of the present disclosure. Similar reference numerals are assigned to similar components in the following description of drawings. In the accompanying drawings, the dimensions of structures were exaggerated larger than the actual dimensions to make the present disclosure clear.

Terms used in the specification, “first”, “second”, etc., may be used to describe various components, but the components are not to be construed as being limited to the terms. The terms are used only to distinguish one component from another component. For example, the "first" component may be named the "second" component, and vice versa, without departing from the scope of the present disclosure.

The terms used herein are used only for the purpose of describing particular embodiments and are not intended to limit the present disclosure. Singular forms are intended to include plural forms unless the context clearly indicates otherwise. It will be further understood that the terms "comprises" or "have" used in this specification specify the presence of stated features, steps, operations, components, parts, or a combination thereof, but do not preclude the presence or addition of one or more other features, numerals, steps, operations, components, parts, or a combination thereof.

Unless defined otherwise, it is to be understood that all the terms used in the specification including technical and scientific terms have the same meanings as those that are understood by those who skilled in the art. It will be further understood that terms such as terms defined in common dictionaries should be interpreted as having a meaning that is consistent with their meaning in the context of this specification and the relevant art and will not be interpreted in an idealized or overly formal sense unless expressly so defined herein.

Figure 2:
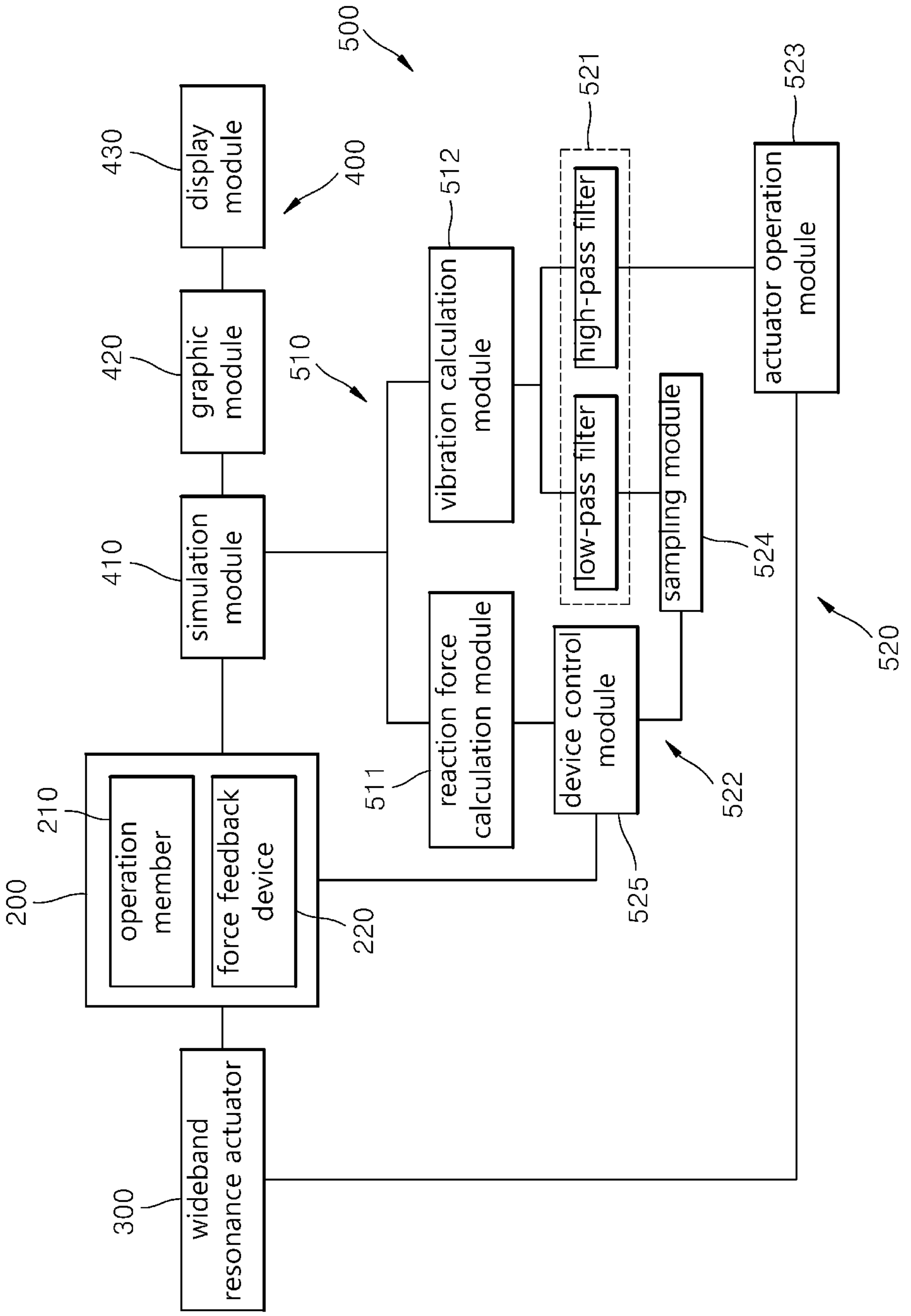
FIG. 2 is a block diagram of the force and complex vibration rendering system using a force feedback device and a wideband resonance actuator of FIG. 1.

A force and complex vibration rendering system 100 using a force feedback device and a wideband resonance actuator according to the present disclosure is shown in FIGS. 1 and 2.

Referring to figures, the force and complex vibration rendering system 100 using a force feedback device, through which a user inputs operation signals, includes: a haptic device 200 that can provide reaction force and vibration to the user; a wideband resonance actuator 300 that is installed at the haptic device 200 and outputs vibration at an output speed different from the output speed of vibration that is generated at the haptic device 200; an image provider that creates and provides a virtual image, which includes at least one target object and an instrument object that is moved in correspondence to an operation signal input to an operation member 210, to the user; and a touch provider 500 that calculates reaction force and vibration, which are generated at the instrument object when the instrument object collides with the target object in the virtual image, and controls the haptic device 200 and the wideband resonance actuator 300 such that the calculated reaction force and vibration are applied to the user.

The haptic device 200 includes an operation member 210 that a user operates to input an operation signal and a force feedback device 200 that applies reaction force or vibration to the user operating the operation member 210.

The operation member 210 includes a body 211, a handle 212 rotatably installed at the body 211 such that a user can holds and operates the handle 212, and a signal generation module (not shown) installed at the body 211 and generating the operation signal in accordance with movement of the handle 212. A user can input an operation signal by holding and moving the handle 212 on the basis of a virtual image that is provided from the image provider. Meanwhile, the operation member 210 is not limited thereto and any type can be applied as long as it is an operation device that a user can hold and operate.

The force feedback device 220 is installed at the operation member 210 to be operated by control of the touch provider 500 and to be able to interfere with movement of the handle 212 or apply vibration to the handle 212 in order to provide touch feedback to a user. The maximum output speed, that is, the maximum output frequency of vibration that is output of the force feedback device 220 is 1 kHz. The force feedback device 220 is a force feedback device that is disposed at the haptic device 200 and is generally used in the related art to provide reaction force and vibration to a user, so it is not described in detail.

The wideband resonance actuator 300 is installed on the handle 212 of the operation member 210 by an adapter 301 and provides vibration to a user through the operation member 210. The wideband resonance actuator 300 can output vibration at an output speed higher than the output speed of vibration that is output from the haptic device 200, and a linear resonance actuator is applied. The adapter 301, though not shown in the figures, has a coupler in which the handle 212 can be inserted and fitted, and the wideband resonance actuator 300 is fixed to a side o the adapter 301. The adapter 301 may be manufactured by a 3D printer.

The image provider 400 includes a simulation module 410 that models an experience situation, which a user wants to be trained with or wants to experience, and simulates the experience situation by applying the operation signal to the modeled experience model, and a graphic module 420 that creates the virtual image on the basis of data simulated by the simulation module 410.

The simulation module 410 models an experience situation on the basis of pre-input information about the experience situation. In this case, information about an experience environment, an experience target, an actual corresponding object of a target object, an actual corresponding object of an instrument object, etc. is included in the experience situation. The simulation module 410 simulates movement of an instrument object and experience situation variation accompanying the movement of the instrument object on the basis of operation information that is provided from the haptic device 200.

Meanwhile, when a target object collides with an instrument object in the simulated experience situation, the simulation module 410 provides collision information to the touch provider 500. In this case, the collision information includes the collision type of the target object and the instrument object, the properties of the actual corresponding object of the target object, the properties of the actual corresponding object of the instrument object, and the invasion depth of the instrument object in the target object, the collision position, the collision speed, the collision angle, force generated in the collision, etc.

The graphic module 420 creates a virtual image by applying the simulation data provided from the simulation module 410 to a visual rendering algorithm. As the virtual image, a 3D image including a target object and an instrument object that is moved in correspondence to the operation signal is applied. In this case, the visual rendering algorithm is an image processing algorithm that is generally used in the related art to create a virtual image on the basis of simulation data, so it is not described in detail. The graphic module 420 outputs a created virtual image to the display module 430.

The display module 430 outputs a virtual image provided from the graphic module 420 and a display panel such as an LCD is applied. Meanwhile, the display module 430 is not limited thereto and any device can be applied as long as it can output a virtual image to a user.

The touch provider 500 includes a feedback calculator 510 that calculates reaction force and vibration that are generated at the instrument object when the instrument object collides with the target object in the virtual image, and a controller 520 that operates the haptic device 200 and the wideband resonance actuator 300 such that touch feedback corresponding to the reaction force and the vibration calculated by the feedback calculator 510 is provided to the user.

The feedback calculator 510 includes a reaction force calculation module 511 that calculates reaction force that is generated at the instrument object when the target object and the instrument object collide with each other, and a vibration calculation module 512 that calculates a vibration signal about vibration generated at the instrument object when the target object and the instrument object collide with each other.

The reaction force calculation module 511 calculates reaction force applied to an instrument object in a collision with a target object on the basis of collision information provided from the simulation module 410. In this case, the reaction force calculation module 511 can calculate the reaction force by applying collision information to a pre-constructed force calculation algorithm. In this case, a reaction force calculation algorithm that is generally used in the related art to calculate reaction force when virtual objects collide with each other is applied as the force calculation algorithm, so the force calculation algorithm is not described in detail. The reaction force calculation module 511 transmits information about the calculated reaction force to the controller 520. In this case, it is preferable that the reaction force calculation module 511 transmits a force vector of the reaction force to the controller 520.

The vibration calculation module 512 calculates a vibration signal about vibration applied to an instrument object in a collision with a target object on the basis of collision information provided from the simulation module 410. In this case, the vibration calculation module 512 calculates the vibration signal by applying information about movement of the instrument object in collision with the target object provided from the image provider 400, that is, collision information to a neural network model constructed in advance to calculate a vibration signal generated at the instrument object on the basis of information about movement of the instrument object when the target object and the instrument object collide with each other. In this case, an Autoregressive Moving Average (ARMA) model is applied as the neural network model. The neural network model creates a vibration waveform, that is, a vibration signal when total of 3-dimensional information, that is, information about properties of an instrument object, a target object, and an actual corresponding object of each object and a speed and force of interaction between corresponding objects in a collision, but may create a vibration waveform more similar to the actuality if using a vibration model that has learned N-dimensional input additionally considering another information that influences actual vibration. The vibration calculation module 512 provides the calculated vibration signal to the controller 520.

The controller 520 includes: a signal classification module 521 that classifies a vibration signal provided from the vibration calculation module 512 into a first unit signal that is an output target signal at the haptic device 200 and a second unit signal that is an output target signal at the wideband resonance actuator 300; a haptic operation module 522 that operates the haptic device 200 such that reaction force and vibration that correspond to the reaction force calculated by the reaction force calculation module 511 and the first unit signal classified by the signal classification module 521 are output; and an actuator operation module 523 that operates the wideband resonance actuator 300 such that vibration corresponding to the second unit signal classified by the signal classification module is output.

The signal classification module 521 filters out a signal having a frequency, which is lower than a preset reference frequency, from a vibration waveform, that is, a vibration signal provided from the vibration calculation module 512 using a low-pass filter, and sets the signal as a first unit signal. Further, the signal classification module 521 filters out a signal having a frequency, which is equal to or higher than the reference frequency, from the vibration signal using a high-pass filter, and sets the signal as a second unit signal. In this case, the reference frequency is set in accordance with the specifications of the force feedback device 220 of the haptic device 200. That is, in the signal classification module 521, the reference frequency is set as a value smaller than the maximum output frequency of vibration that is output from the force feedback device 220 so that the force feedback device 220 can more stably output vibration. In this case, it is preferable that the reference frequency is 150 Hz.

The haptic operation module 522, which controls the force feedback device 220 in correspondence to the reaction force and the first unit signal output from the reaction force calculation module 511, includes a sampling module 524 and a device control module 525.

The sampling module 524 samples the first unit signal provided from the signal classification module 521 into a force vector at the current point in time by applying the first unit signal to a pre-constructed vibration-force sampling algorithm. In this case, the vibration-force sampling algorithm is an algorithm that is generally used in the related art to convert a vibration signal into a force vector, so it is not described in detail. The sampling module 523 transmits the calculated force vector of the first unit signal to a device operation module.

The device control module 525 sums up the force vector of the sampled first unit signal and the reaction force provided from the reaction force calculation module 511. That is, the device control module 525 sums up the force vector of the first unit signal and the force vector of the reaction force provided from the reaction force calculation module 511. In this case, the device control module 525 corrects the summed force vector by applying the force vector to a pre-constructed control algorithm so that the force feedback device 220 of the haptic device 200 can stably output the force vector. The control algorithm is constructed in advance in accordance with the specifications of the haptic device 200 and a data correction algorithm that is generally used in the related art to correct a force vector value in accordance with the haptic device 200 to be used is applied, so it is not described in detail. The device control module 525 operates the force feedback device 220 in accordance with the corrected force vector value.

The actuator operation module 523 operates the wideband resonance actuator 300 in accordance with a second unit signal provided from the signal classification module. The controller 520 operates the force feedback device 220 and the wideband resonance actuator 300 in accordance with first and second unit signals, respectively, but the wideband resonance actuator 300 is installed at the haptic device 200, so it is possible to provide complex vibration to a user.

The force and complex vibration rendering system 100 using the force feedback device 220 and the wideband resonance actuator 300 according to the present disclosure can operate in real time, so it can be applied to a technology of automatically generating force and vibration effect in a simulation program requiring interaction with an object in a virtual experience environment. Further, it is possible to construct a reaction and vibration rendering system 100 that is optimized to a use scenario if selecting the force feedback device 220 and the wideband resonance actuator 300 in consideration of the magnitude of force and the bandwidth of vibration that are required for a simulation program to be applied.

Figure 3:
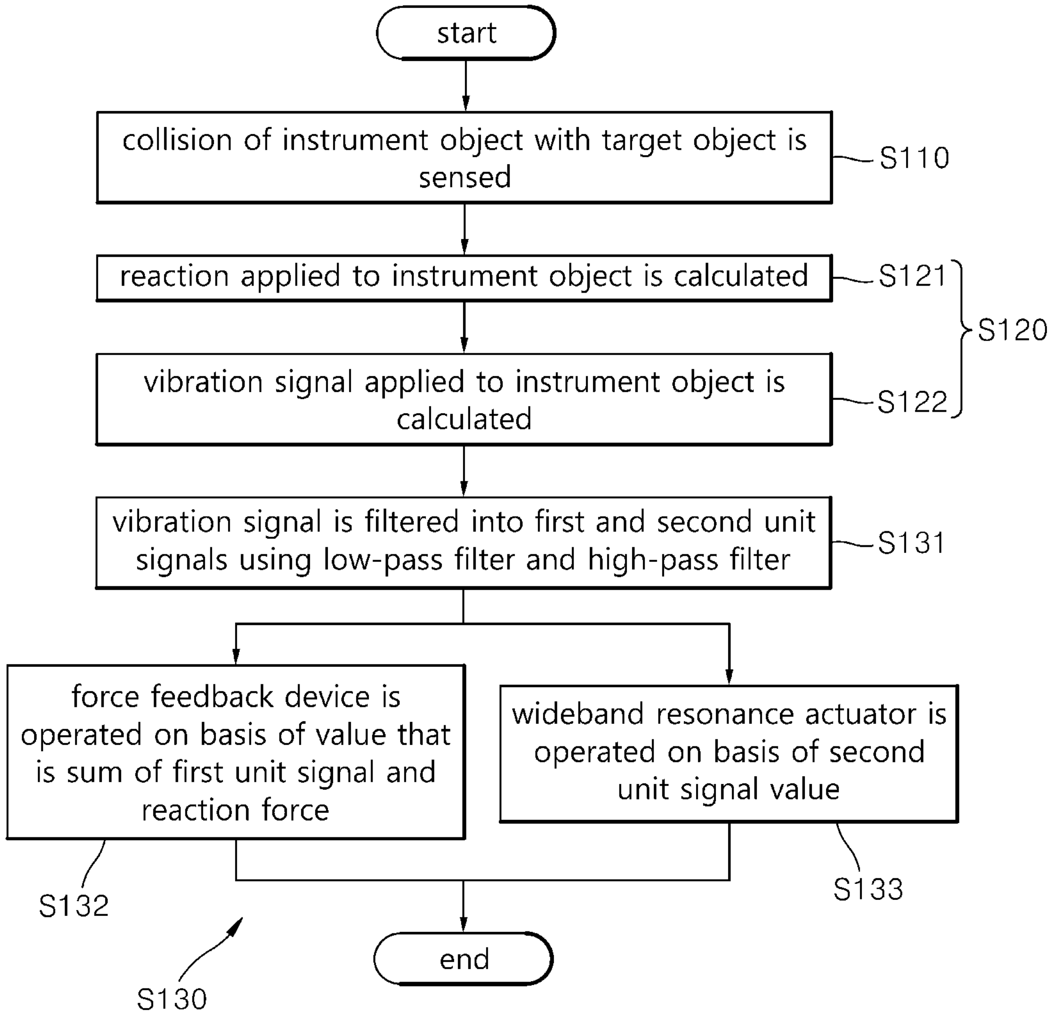
FIG. 3 is a flowchart of a method for providing force and complex vibration using the force and complex vibration rendering system using a force feedback device and a wideband resonance actuator according to the present disclosure.

Meanwhile, FIG. 3 shows a flowchart of a method for providing force and complex vibration using the force and complex vibration rendering system 100 using the force feedback device 220 and the wideband resonance actuator according to the present disclosure.

Referring to the figure, the method for providing force and complex vibration includes a collision sensing step, a feedback calculating step, and an operating step.

The collision sensing step is a step of sensing a collision of an instrument object, which is moved in accordance with an operation signal input by a user operating the haptic device 200 in a virtual image, with a target object included in the virtual image. The simulation module 410 senses a collision between a target object and an instrument object in a simulated experience situation, and when a collision occurs, the simulation module 410 creates and transmits collision information of the instrument object to the touch provider 500.

The feedback calculation step, which is a step in which the feedback calculator 510 calculates reaction force and vibration that are generated at the instrument object when a collision of the target object and the instrument object is sensed in the collision sensing step, includes a reaction force calculation step and a vibration calculation step.

The reaction force calculation step is a step of calculating reaction force that is generated at an instrument object when a target object and the instrument object collide with each other. The reaction force calculation module 511 calculates reaction force applied to an instrument object in a collision with a target object on the basis of collision information provided from the simulation module 410.

The vibration calculation step is a step of calculating a vibration signal about vibration that is generated at an instrument object that has collided with a target object. In this case, the vibration calculation module 512 calculates a vibration signal about vibration applied to an instrument object in a collision with a target object on the basis of collision information provided from the simulation module 410. As described above, the vibration calculation module 512 calculates a vibration waveform, that is, a vibration signal by applying collision information to a neural network model to having an ARMA applied thereto.

The operating step, which is a step in which the controller 520 operates the haptic device 200 and the wideband resonance actuator 300 installed at the haptic device 200 such that touch feedback corresponding to reaction force and vibration calculated in the feedback calculation step is provided to a user, includes a signal classification step, a first device control step, and a second device control step.

The signal classification step is a step of classifying a vibration signal calculated in the vibration calculation step into a first unit signal that is an output target signal at the haptic device 200 and a second unit signal that is an output target signal at the wideband resonance actuator 300. In this case, the signal classification module 521 filters out a signal having a frequency, which is lower than a preset reference frequency, from a vibration waveform, that is, a vibration signal provided from the vibration calculation module 512 using a low-pass filter, and sets the signal as a first unit signal. Further, the signal classification module 521 filters out a signal having a frequency, which is equal to or higher than the reference frequency, from the vibration signal using a high-pass filter, and sets the signal as a second unit signal. In this case, the reference frequency is set in accordance with the specifications of the force feedback device 220 of the haptic device 200.

The first device control step is a step of operating the haptic device 200 such that reaction force and vibration that correspond to the reaction force calculated in the reaction force calculation step and the first unit signal classified in the signal classification step are output. The haptic operation module 522 converts the first unit signal provided from the signal calculation module 521 into a force vector, sums up the converted force vector of the first unit signal and the force vector of the reaction force provided from the reaction force calculations module 521, and applies the summed force vector to the force feedback device 220, thereby controlling the force feedback device 220. In this case, it is preferable that the haptic operation module 522 corrects the summed force vector by applying the summed force vector to a pre-constructed control algorithm.

The second device control step is a step of operating the wideband resonance actuator 300 such that vibration corresponding to the second unit signal classified in the signal classification step is output. The actuator operation module 523 operates the wideband resonance actuator 300 in accordance with the second unit signal provided from the signal classification module.

The force and complex vibration rendering system 100 using the haptic device 200 and the wideband resonance actuator according to the present disclosure configured as described above and a method for providing force and complex vibration using the system provide not only reaction force but wide bandwidth vibration to a user when a collision situation occurs in virtual simulation through a wideband resonance actuator that generates vibration at an output speed higher than a vibration output speed of the force feedback device of the haptic device 200, so the system and method have an advantage that it is possible to provide more real touch feedback to the user.

The description of the proposed embodiments is provided to enable those skilled in the art to use or achieve the present disclosure. Various modifications of the embodiments would be apparent to those skilled in the art, and general principles defined herein may be applied to other embodiments without departing from the scope of the present disclosure. Therefore, the present disclosure is not limited to the embodiments proposed herein and should be construed in the widest range that is consistent with the principles proposed herein and new characteristics.

What is claimed is:

1. A force and complex vibration rendering system using a force feedback device and a wideband resonance actuator, the force and complex vibration rendering system comprising: a haptic device configured to be operated by a user to input an operation signal and configured to be able to provide reaction force or vibration to the user;

a wideband resonance actuator installed at the haptic device and configured to output vibration at an output speed different from an output speed of vibration that is generated at the haptic device;

an image provider configured to create and provide a virtual image, which includes at least one target object and an instrument object that is moved in correspondence to an operation signal input to an operation member, to the user; and a touch provider configured to calculate reaction force and vibration, which are generated at the instrument object when the instrument object collides with the target object in the virtual image, wherein the touch provider is further configured to:

classify a vibration signal generated by the collision into a low-frequency component and a high-frequency component;

control the haptic device such that the reaction force and the low-frequency component are applied to the user; and control the wideband resonance actuator such that the high-frequency component is applied exclusively by the wideband resonance actuator, thereby preventing the force feedback device from outputting the high-frequency component.

2. The force and complex vibration rendering system of claim 1, wherein the touch provider includes:

a feedback calculator configured to calculate reaction force and vibration that are generated at the instrument object when the instrument object collides with the target object in the virtual image; and a controller configured to operate the haptic device and the wideband resonance actuator such that touch feedback corresponding to the reaction force and the vibration calculated by the feedback calculator is provided to the user.

3. The force and complex vibration rendering system of claim 2, wherein the feedback calculator includes:

a reaction force calculation module configured to calculate reaction force that is generated at the instrument object when the target object and the instrument object collide with each other; and a vibration calculation module configured to calculate a vibration signal about vibration generated at the instrument object when the target object and the instrument object collide with each other.

4. The force and complex vibration rendering system of claim 3, wherein the controller includes:

a signal classification module configured to classify a vibration signal provided from the vibration calculation module into a first unit signal that is an output target signal at the haptic device and a second unit signal that is an output target signal at the wideband resonance actuator;

a haptic operation module configured to operate the haptic device such that reaction force and vibration that correspond to the reaction force calculated by the reaction force calculation module and the first unit signal classified by the signal classification module are output; and an actuator operation module configured to operate the wideband resonance actuator such that vibration corresponding to the second unit signal classified by the signal classification module is output.

5. The force and complex vibration rendering system of claim 2, wherein the wideband resonance actuator can output vibration at an output speed higher than the output speed of vibration that is output from the haptic device.

6. The force and complex vibration rendering system of claim 4, wherein the signal classification module sets a signal having a frequency, which is lower than a preset reference frequency, in the operation signal as the first unit signal and sets a signal having a frequency, which is equal to or higher than the reference frequency, as the second unit signal.

7. The force and complex vibration rendering system of claim 6, wherein the reference frequency is set in the signal classification module as a value smaller than a maximum output frequency of vibration that is output from the haptic device.

8. The force and complex vibration rendering system of claim 6, wherein the reference frequency is 150 Hz.

9. The force and complex vibration rendering system of claim 3, wherein the vibration calculation module calculates the vibration signal by applying information about movement of the instrument object in collision with the target object provided from the image provider to a neural network model constructed in advance to calculate a vibration signal generated at the instrument object on the basis of information about movement of the instrument object when the target object and the instrument object collide with each other.

10. The force and complex vibration rendering system of claim 9, wherein the neural network model is an Autoregressive Moving Average (ARMA) model.

11. The force and complex vibration rendering system of claim 1, wherein the haptic device includes:

an operation member configured to be operated by a user to input an operation signal; and a force feedback device configured to apply reaction force or vibration to the user operating the operation member, and the wideband resonance actuator is installed at the operation member by an adapter and applies vibration to the user through the operation member.

12. The force and complex vibration rendering system of claim 11, wherein the force feedback device is installed at the operation member and provides reaction force or vibration to the user through the operation member.

13. A method for providing force and complex vibration, the method comprising:

a collision sensing step of sensing a collision of an instrument object, which is moved in accordance with an operation signal input by a user operating a haptic device in a virtual image, with a target object included in the virtual image;

a feedback calculation step of calculating reaction force and vibration that are generated at the instrument object by means of a feedback calculator when a collision of the target object and the instrument object is sensed in the collision sensing step; and an operating step of operating the haptic device and a wideband resonance actuator installed at the haptic device by means of a controller such that touch feedback corresponding to the reaction force and the vibration calculated in the feedback calculation step is provided to the user, wherein the operating step further comprises:

classifying a vibration signal generated by the collision into a low-frequency component and a high-frequency component;

controlling the haptic device such that the reaction force and the low-frequency component are applied to the user; and controlling the wideband resonance actuator such that the high-frequency component is applied exclusively by the wideband resonance actuator, thereby preventing the force feedback device from outputting the high-frequency component.

14. The method of claim 13, wherein the feedback calculation step includes:

a reaction force calculation step of calculating reaction force that is generated at the instrument object when the target object and the instrument object collide with each other; and a vibration calculation step of calculating a vibration signal about vibration generated at the instrument object in collision with the target object.

15. The method of claim 14, wherein the operation step includes:

a signal classification step of classifying a vibration signal provided in the vibration calculation step into a first unit signal that is an output target signal at the haptic device and a second unit signal that is an output target signal at the wideband resonance actuator;

a first device control step of operating the haptic device such that reaction force and vibration that correspond to the reaction force calculated in the reaction force calculation step and the first unit signal classified in the signal classification step are output; and a second device control step of operating the wideband resonance actuator such that vibration corresponding to the second unit signal classified in the signal classification step is output.

16. The method of claim 13, wherein the wideband resonance actuator can output vibration at an output speed higher than the output speed of vibration that is output from the haptic device.

17. The method of claim 15, wherein the signal classification step sets a signal having a frequency, which is lower than a preset reference frequency, in the operation signal as the first unit signal and sets a signal having a frequency, which is equal to or higher than the reference frequency, as the second unit signal.

18. The method of claim 17, wherein the reference frequency is set in the signal classification step as a value smaller than a maximum output frequency of vibration that is output from the haptic device.

19. The method of claim 17, wherein the reference frequency is 150 Hz.

20. The method of claim 14, wherein the vibration calculation step calculates the vibration signal by applying information about movement of the instrument object provided from an image provider that creates a virtual image to a neural network model constructed in advance to calculate a vibration signal generated at the instrument object on the basis of information about movement of the instrument object when the target object and the instrument object collide with each other.

21. The method of claim 20, wherein the neural network model is an Autoregressive Moving Average (ARMA) model.

* * * * *